Oct. 13, 1959     S. F. MICHATEK ET AL     2,908,208
AUTOMATIC SHUTTER ACTUATING AND FILM ADVANCE MECHANISM
Filed July 5, 1957     2 Sheets-Sheet 1
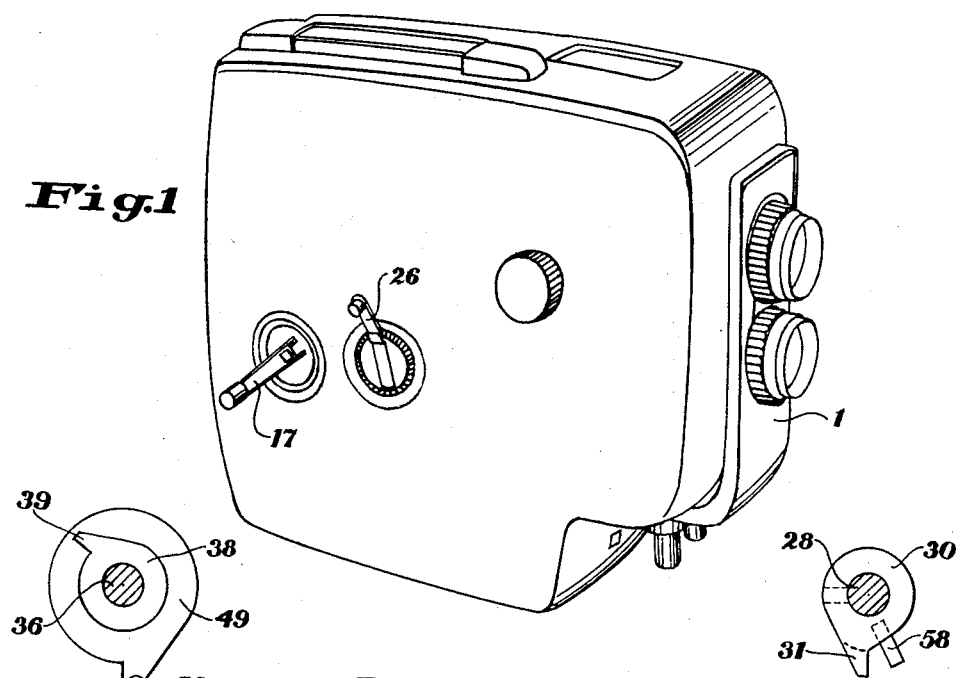
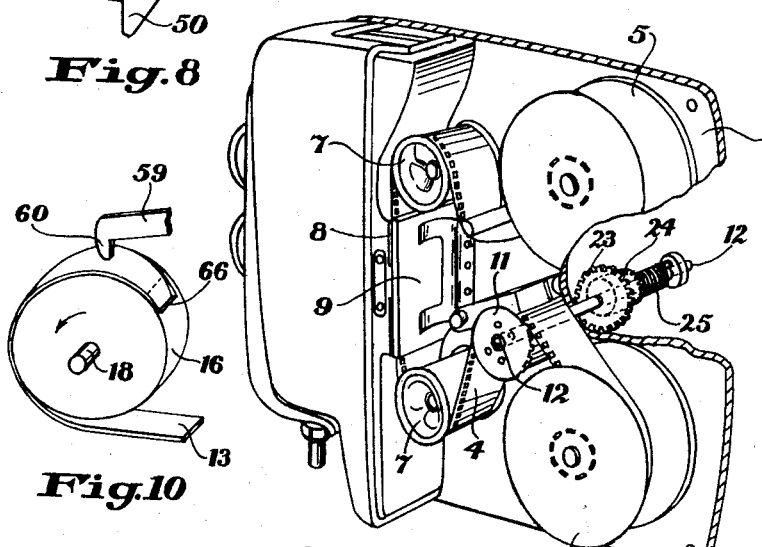
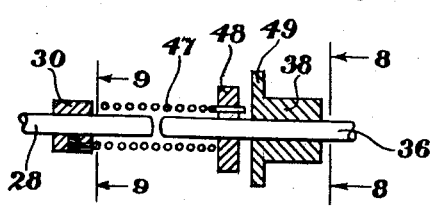
James E. Ferris
Carter J. Hughey
Stephen F. Michatek
INVENTORS
BY
ATTORNEYS Oct. 13, 1959 S. F. MICHATEK ET AL 2,908,208
AUTOMATIC SHUTTER ACTUATING AND FILM ADVANCE MECHANISM
Filed July 5, 1957 2 Sheets-Sheet 2
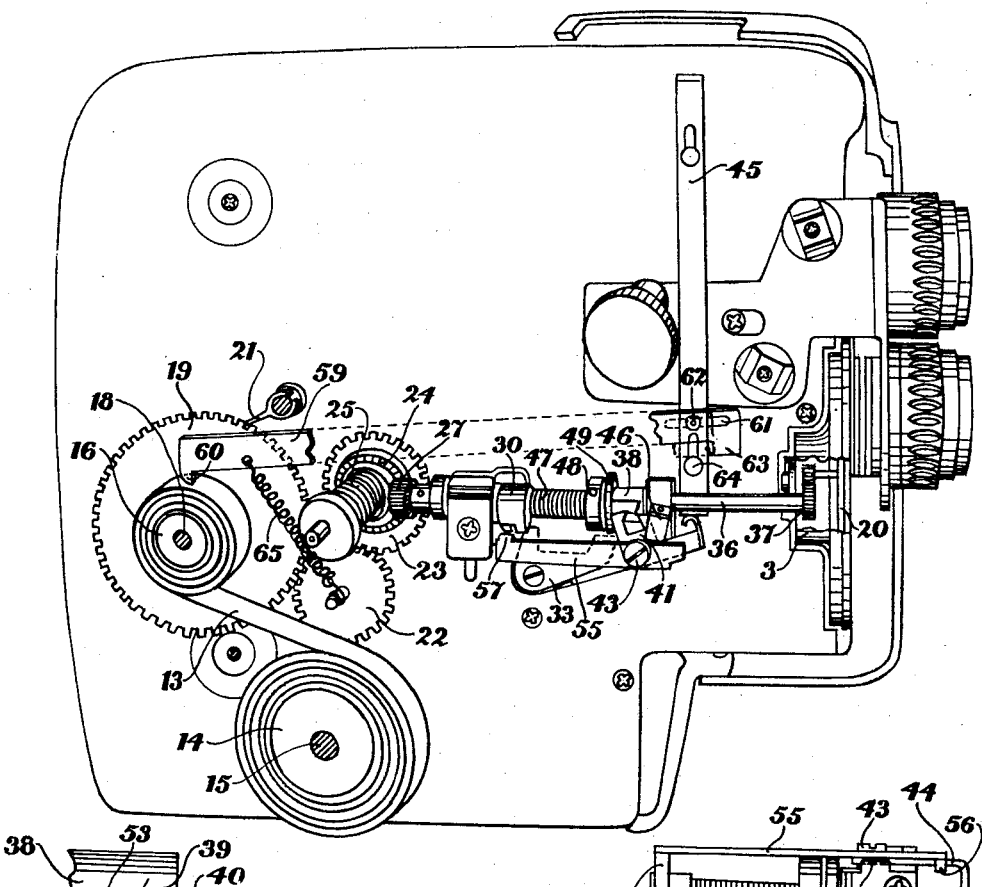
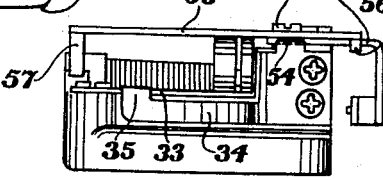
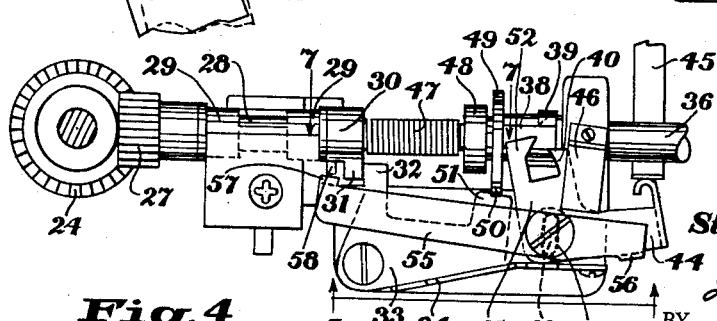
James E. Ferris
Carter J. Hughey
Stephen F. Michatek
INVENTORS
BY
ATTORNEYS

United States Patent Office 2,908,208
Patented Oct. 13, 1959

2,908,208

AUTOMATIC SHUTTER ACTUATING AND FILM ADVANCE MECHANISM

Stephen F. Michatek, Carter J. Hughey, and James E. Ferris, Rochester, N.Y., assignors to Eastman Kodak Company, Rochester, N.Y., a corporation of New Jersey Application July 5, 1957, Serial No. 670,317

21 Claims. (Cl. 95—31)

This invention relates generally to cameras and more specifically to an improved camera having means adapted upon the depression of a shutter trip lever to actuate the shutter mechanism to make an exposure. The shutter mechanism while running down actuates the film advance mechanism to simultaneously advance the film one frame and retension the shutter.

The manufacture and design of cameras specifically for use in portrait work is generally well known. Such cameras are particularly useful for taking individual portraits of large groups of students in schools. The camera is also being used in industry, particularly in the employment department of companies. Some of the more important requirements of a camera of this type are that: (1) the camera be of simple yet rugged construction to withstand the abuse that they are normally subjected to in operation; (2) the camera be economical, of simple design, easy to operate and thoroughly reliable and efficient in operation; and (3) the camera be as automatic in operation as possible to eliminate stopping between exposures to effect such time consuming camera operations as advancing the film an exposure frame and retensioning the shutter operating spring. The automatic operation of the camera further substantially reduces film wastage caused by the photographer inadvertently making a double exposure or advancing the film more than one frame.

Therefore, one of the primary objects of this invention is to provide an improved automatic shutter-actuating and film advance mechanism that is simple in construction, thoroughly reliable and efficient in operation, and economical in manufacture.

Another object of this invention is the provision of an automatic shutter-actuating and film advance mechanism obviating the usual hand winding of the film following an exposure.

Still another object of the invention is the provision of a film advance mechanism that simultaneously advances the film and retensions a helical spring an amount necessary to operate a shutter mechanism for the next exposure.

A more specific object of the invention is the provision of an automatic shutter actuating and film advance mechanism in which the depression of a shutter trip lever releases the shutter mechanism to make an exposure. The shutter mechanism while running down actuates an escapement device releasing the film advance mechanism which simultaneously advances the film one frame and retensions the shutter.

Objects and advantages other than those set forth above will be apparent from the following description when read in connection with the accompanying drawings, in which:

Fig. 1 is a perspective view of a camera embodying the invention;

Fig. 2 is a perspective view of the camera of Fig. 1 with a part of the outer casing removed and a portion broken away to show a part of the film advance mechanism;

Fig. 3 is an enlarged perspective view of the opposite side of the camera of Fig. 2 showing the shutter mechanism and the drive and metering apparatus of the film advance mechanism;

Fig. 4 is an enlarged fragmentary view of a portion of the camera of Fig. 3 showing the shutter actuating mechanism at the moment it releases the film advance mechanism;

Fig. 5 is a view taken along line 5—5 of Fig. 4;

Fig. 6 is an enlarged fragmentary view of a portion of the shutter escapement mechanism of Fig. 3;

Fig. 7 is a section view taken along line 7—7 of Fig. 4;

Fig. 8 is a view taken along line 8—8 of Fig. 7;

Fig. 9 is a view taken along line 9—9 of Fig. 7; and

Fig. 10 is a perspective view of the spring motor drum.

Referring to the drawings, this invention is illustrated as applied to a camera 1 having a vertically disposed plate 2 as seen in Fig. 2 cooperating with the outer camera casing and mounted centrally thereof to form adjacent housings. One of the housings encloses a shutter actuating mechanism for operating a shutter 3 to expose the film 4, and a film drive and metering mechanism cooperating with the shutter 3 to provide the motive power and metering control for the film advance. The other housing encloses a film transport and take-up mechanism as shown in Fig. 2 comprising a film supply reel 5, a take-up reel 6, a pair of guide rollers 7 to guide the film across an apertured film gate 8, a spring urged pressure shoe 9 to hold the film in contact with the film gate 8, and a drive sprocket 11 mounted on one end of a shaft 12 and having teeth adapted to drivingly engage the perforations of the film 4. The sprocket 11 is drivingly connected to the take-up reel 6 by a spring belt, not shown, so that rotation of the sprocket 11 by the film drive mechanism automatically rotates the take-up reel 6 to wind up the exposed film 4. The plate 2 which separates the housings also provides the support base upon which the shutter actuating, film drive and metering, and film transport and take-up mechanisms are mounted.

The film transport and take-up apparatus is powered by the film drive mechanism comprising a spring motor means shown as a Negator spring 13 mounted on a core 14 carried by a shaft 15. The spring 13 is adapted to be unwound from the core 14 and wound onto a take-up drum 16 by means of a handle 17 as seen in Fig. 1 secured to the end of a shaft 18 rotatably supporting the drum 16. The tendency of the spring 13 to return to its original position on the core 14 provides the motive force for driving the film transport and take-up mechanism to advance the film 4. A pawl, not shown, cooperates with the drum 16 in a known manner so that the drum can be rotated in a clockwise direction on the shaft 18 as seen in Fig. 3 to wind up the spring, but cannot be turned in the opposite direction. A drive gear 19 is rotatably mounted on the shaft 18 adjacent the drum 16 and has a pawl 21 preventing clockwise rotation of the gear 19 and another pawl, not shown, to drivingly connect the drum 16 to the gear 19 when the drum is rotated by the spring 13 while rewinding on the core 14. The gear 19 is also drivingly connected by gear 22 to a gear 23 rotatably mounted on the sprocket shaft 12. A ring gear 24 is rotatably mounted on the shaft 12 adjacent the gear 23 and is keyed thereto so that they both rotate together. The gears 23, 24 are drivingly connected to the shaft 12 through a one way spiral spring clutch 25 of a known type so wound that rotation of the gears 19, 22, 23 and 24 by the spring motor causes the spring clutch 25 to contract and grip the shaft 12 drivingly connecting the gears and spring motor to the shaft 12 which is rotated thereby to advance the film 4.

Also, rotation of the shaft 12 by hand in one direction expands the spring clutch 25 permitting the shaft 12 and sprocket 11 to turn in a direction to advance the film 4. A knob 26 as seen in Fig. 1 is screwed onto the end of the shaft 12 to permit the photographer to thread the film 4 through the film transport and take-up mechanism and advance the film by the knob 26 to the first exposure position.

The film metering mechanism comprises a pinion 27 mounted on one end of a stub shaft 28 as shown in Figs. 4 and 7 disposed for rotation within bearings 29 carried by the plate 2. The stub shaft 28 is provided with a control means shown as an escapement mechanism comprising a sleeve 30 mounted on its other end having a lug 31 adapted to engage a leg 32 of a dog member 33. The dog member 33 is pivotally mounted on a casting secured to the plate 2 and in one position thereof as seen in Fig. 3 has the leg 32 engaging the lug 31 to provide a stop means for preventing rotation of the sprocket shaft 12 as urged by the spring 13. Means to be explained hereinafter are provided for pivoting the dog member 33 against the bias of a flat spring 34 withdrawing the leg 32 thereof from the lug 31 permitting the sprocket shaft 12 to be rotated a complete revolution to advance the film 4 one frame for another exposure. The spring 34 is mounted on the casting as shown in Fig. 5 and has a lip 35 which urges the dog member 33 back into its original position causing the leg 32 to intercept the lug 31 after one revolution of the stub shaft 28 and sleeve 30. The diameter of the gears 27, 24 and the size of the sprocket 11 are properly selected so that one revolution of the shaft 28 and gear 27 advances the film exactly one frame.

The shutter actuating mechanism of this invention comprises a shutter shaft 36 carried by the casting. The shutter shaft 36 is disposed in axial alignment with the stub shaft 28 as shown in Fig. 7 and has a pinion 37 mounted at one end thereof adapted to actuate the Robot shutter 3 which is of well-known design comprising a rotating sector blade 20 cooperating with an aperture, not shown. The shaft 36 is provided with a control means shown as an escapement mechanism comprising a sleeve 38 mounted on its other end having a beveled ear 39 as best seen in Fig. 6 adapted to engage an arm 40 of a bellcrank 41. The bellcrank 41 has an elongated slot 42 shown dotted in Fig. 4 through which a stud 43 extends to pivotally mount the bellcrank 41 to the casting. The bellcrank 41 is provided with an extending arm 44 having a flange at its end engageable by a reciprocally movable trip member 45 for pivotally moving the bellcrank 41 against the bias of a flat friction spring 46 causing the arm 40 to release the ear 39. The spring 46 is secured to the casting at one end and has its free end extending over and frictionally engaging the bellcrank 41 at all times.

The shutter-actuating mechanism is powered by a helical spring 47 connecting the axially aligned shafts 28, 36. One end of the spring 47 is secured to the sleeve 30, and its opposite end secured to a cylindrical member 48 mounted on the shaft 36. The proper tension necessary to rotate the shutter shaft 36 through one revolution is imparted to the spring 47 by turning the cylindrical member 48 a sufficient number of turns on the shaft 36 while the opposite end of the spring is held fixed, and then locking the member 48 to the shaft 36.

The means for releasing the film drive metering mechanism comprises a disk cam 49 secured to the sleeve 38 for rotation therewith and provided with a nipple 50 as best seen in Fig. 8 on its periphery adapted to engage another leg 51 of the dog member 33 to pivot the member in a direction withdrawing the leg 32 from the lug 31 as seen in Fig. 4. The nipple 50 is angularly positioned with respect to the ear 39 so that the film drive and metering mechanism is released as the shutter shaft 36 nears the completion of its revolution.

In order to positively insure stoppage of the shutter shaft 36 after one revolution, the bellcrank 41 is provided with a leg 52 spaced from and parallel to the arm 40. The leg 52 has a V-shaped end 53 adapted to extend over the beveled ear 39 as seen dotted in Fig. 6 when the bellcrank 41 is pivoted to release the ear 39. It is clearly seen that when the ear 39 is released, it will upon completion of one revolution strike the leg 52 which will stop further rotation of the shutter shaft 36. When the bellcrank 41 is returned to its original position by means to be explained hereinafter, the ear 39 drops off the leg 52 and engages the arm 40. The ear 39 strikes the leg 52 with considerable impact forcing the bellcrank 41 downwardly by virtue of the elongated slot 42 into engagement with a lip 54 of the spring member 34 which absorbs the impact.

A mechanism is provided for accomplishing the dual function of returning the depressed trip member 45 and bellcrank 41 to their original positions against the bias of the friction spring 46, and preventing rapid successive releases of the shutter actuating mechanism resulting in a loss of tension in the shutter spring 47 causing the shutter shaft 36 to stop before completing the second revolution. This results in jamming the shutter actuating mechanism. The reason this is possible is that the shutter shaft 36 rotates considerably faster than the stub shaft 28. Consequently, rapid successive releases of the shutter uses the spring tension faster than the stub shaft 28 can retension the spring 47. This mechanism comprises a lever 55 pivoted on the stud 43 and having a lip 56 at one end engaging the underside of the bellcrank arm 44 as shown in Figs. 4 and 5. The opposite end of the lever 55 is provided with a finger 57 disposed in the path of a pin 58 secured to the sleeve 30 as best seen in Figs. 4 and 9. The pin 58 strikes the finger 57 and pivots the lever 55 just prior to the completion of the film advance urging the bellcrank 41 and trip member 45 into their original position in preparation for another exposure.

Another lever 59 is provided to stop the spring 13 and drum 16 when the end of the spring 13 is reached on the drum 14 and no longer contains sufficient motive power to advance the film. The lever 59 further prevents depression of the shutter trip lever 45 after the spring motor 13 reaches its stop, and the consequent loss of tension of the shutter spring 47 that would result from such a depression. The lever 59 as shown in Fig. 3 has a hook 60 adapted to ride on the surface of the spring 13 and to engage the edge of a slot 66 in the drum 16 as shown in Fig. 10 to stop any further rotation of the drum when the end of the spring 13 is reached. The force of the spring 13 tending to rotate the drum 16 in a counter clockwise direction as seen in Fig. 10 against the hook 60 causes the lever 59 to move to the left by virtue of the slot 61, and screw 62 carried by the lever 45. Movement of the lever 59 disposes a flange 63 formed thereby into engagement with a stud 64 which is secured to the base 2 to prevent depression of the lever 45 as shown dotted in Fig. 3. When the spring motor is rewound, the hook 60 rides on the spring 13 which in winding covers the slot 66 in the drum 14, and a spring 65 urges the lever 59 into its original position releasing the trip lever 45.

In the operation of this invention, assuming initially that the spring motor 13 has been wound, the film 4 has been advanced to a first-exposure position by the knob 26 and that the helical shutter spring 47 has been properly tensioned during assembly, the depression of the trip member 45 pivots the bellcrank 41 releasing the ear 39 of the escapement mechanism whereupon the spring rotates the shutter shaft 36 through one complete revolution actuating the shutter 3 to make an exposure. As the shutter shaft 36 nears the completion of its revolution, the nipple 50 of the disk cam 49 strikes the leg 51 of the dog member 33 pivotally moving the dog member in a direction to release the lug 31 of the escapement mechanism as shown in Fig. 4. Upon release of the escapement mechanism, the Negator spring 13 rewinds on the core 14 imparting rotation to the drum 16, gears 19, 22 and 23 and sprocket shaft 12 which advances the film. Rotation is also imparted to the pinion 27, stub shaft 28 and sleeve 30 which is stopped after one revolution by the leg 32 of the dog member 33 intercepting the lug 31 to limit the film advance to one exposure frame. The pin 58 carried by the sleeve 30 strikes the lever 55 near the end of the film advance which urges the bellcrank 41 and trip member 45 back into their original positions in preparation for another exposure.

Although but one embodiment has been illustrated and described, it will be apparent to those skilled in the art that various changes and modifications may be made therein without departing from the spirit of the invention or from the scope of the appended claims.

We claim:

1. In a camera mechanism adapted to automatically actuate a shutter to make an exposure and advance the film an exposure frame, the combination of; a shutter shaft adapted upon rotation to actuate said shutter to make an exposure; a stub shaft; resilient means interconnecting said shafts and being pretensioned sufficiently to rotate said shutter shaft through one revolution while said stub shaft is stationary; a film advance mechanism connected to said stub shaft and controlled thereby; a first escapement mechanism associated with said shutter shaft and adapted to limit the rotation of said shutter shaft to one revolution; a second escapement mechanism associated with said stub shaft and adapted to limit the rotation of said stub shaft to one revolution; release means carried by said shutter shaft adapted when said shutter nears the completion of its revolution to release said second escapement mechanism; and tripping means for actuating said first escapement mechanism whereby said shutter shaft is rotated one revolution by said pretensioned resilient means to actuate said shutter to make an exposure, and said release means releases said second escapement mechanism permitting said film advance mechanism to advance said film one frame and to rotate said stub shaft one revolution to retension said resilient means in preparation for the succeeding exposure.

2. The invention as defined in claim 1 wherein said film advance mechanism comprises a spring, a shaft having a sprocket mounted thereon in engagement with the film perforations, a gear train connecting said spring to said shaft, and a ring gear carried by said shaft adapted to engage a pinion mounted on said stub shaft.

3. The invention as defined in claim 1 wherein said resilient means comprises a spring having one end connected to said shutter shaft and the opposite end connected to said stub shaft.

4. The invention as defined in claim 1 wherein said first escapement mechanism comprises a lug carried by said shutter shaft, and a pivotally mounted bellcrank having one lever cooperating with said lug and another lever cooperating with said tripping means whereby said bellcrank is pivoted causing said one lever to release said lug and then stop said lug after it has rotated one revolution.

5. The invention as defined in claim 4 wherein said one lever of said bellcrank forms a pair of spaced apart arms in which one of said arms engages said lug and said other arm has a beveled tip portion facing said one arm and adapted when said one arm releases said lug to intercept said lug after it has rotated one revolution.

6. The invention as described in claim 4 wherein said bellcrank is provided with an elongated slot permitting movement thereof in one direction when said lug strikes said bellcrank, and a spring adapted to bias said bellcrank in the opposite direction to absorb the impact of said lug on said bellcrank.

7. The invention as defined in claim 1 wherein said second escapement mechanism comprises an ear carried by said stub shaft, and a pivoted spring biased dog member having one leg cooperating with said ear and another leg cooperating with said release means carried by said shutter shaft.

8. The invention as defined in claim 1 wherein said release means for releasing said second escapement mechanism comprises a disk cam carried by said shutter shaft and having a nipple on its periphery adapted to actuate said second escapement mechanism.

9. In a camera mechanism adapted to automatically actuate a shutter to make an exposure and advance the film an exposure frame, the combination of: a shutter shaft adapted upon rotation to actuate said shutter to make an exposure; a stub shaft in axial alignment with said shutter shaft and spaced therefrom; a first spring having one end secured to said shutter shaft and said opposite end secured to said stub shaft, said first spring being pretensioned sufficiently to rotate said shutter shaft through one revolution while said stub shaft is stationary; a film advance mechanism including a second spring, a shaft having a sprocket mounted thereon in engagement with the film perforations, a gear train connecting said second spring to said sprocket shaft for rotating said shaft to advance the film, and a gear carried by said sprocket shaft and connected to said gear train to rotate therewith for driving a pinion mounted on said stub shaft; a first escapement mechanism including a lug carried by said shutter shaft, and a pivotally mounted bellcrank having a lever cooperating with said lug and adapted to limit the rotation of said shutter shaft to one revolution; a second escapement mechanism including an ear carried by said stub shaft, and a pivoted, spring biased dog member having one leg cooperating with said ear and adapted to limit the rotation of said stub shaft to one revolution; a disk cam carried by said shutter shaft and having a nipple on its periphery adapted when said shutter shaft nears the completion of its revolution to engage another leg of said dog member and pivotally urge said dog member withdrawing said one leg from said lug to release said stub shaft and film advance mechanism; and a shutter trip mechanism for pivotally moving said bellcrank and withdrawing said lever from said lug whereby automatically said shutter shaft is rotated one revolution by said first spring actuating said shutter to make an exposure, and said nipple of said disk cam releases said second escapement mechanism permitting said film advance mechanism to advance said film one frame and to rotate said stub shaft one revolution to retension said first spring in preparation for the succeeding exposure.

10. The invention as defined in claim 9 wherein said lever of said bellcrank forms a pair of spaced apart arms in which one of said arms engages said lug and said other arm has a beveled tip portion facing said one arm and adapted when said one arm releases said lug to intercept said lug after it has rotated one revolution.

11. The invention as defined in claim 9 wherein said bellcrank is provided with an elongated slot permitting movement thereof in one direction when said lug strikes said bellcrank, and a spring adapted to bias said bellcrank in the opposite direction to absorb the impact of said lug on said bellcrank.

12. The invention as defined in claim 1 wherein said tripping means is held by a friction member in whatever position it happens to be disposed, a pin is carried by said stub shaft, and a pivotally mounted lever is actuable by said pin upon rotation of said stub shaft to return said tripping means into its original position against the bias of said friction member.

13. The invention as defined in claim 9 wherein said bellcrank which is pivotally moved by said shutter trip mechanism to release said shutter shaft is held in its pivoted position by a friction spring, a pin is carried by said stub shaft, and a pivotally mounted lever is actuable by said pin upon rotation of said stub shaft to return said bellcrank and shutter trip mechanism to their original position.

14. The invention as defined in claim 1 wherein said film advance mechanism comprises a spring motor, said tripping means comprises a reciprocally movable shutter trip member, and latch means are provided for simultaneously stopping said spring motor when the end of the spring is reached and locking said shutter trip member.

15. The invention as defined in claim 14 wherein said latch means comprises a lever having a hook at one end adapted to engage and stop said spring, and a flange at the opposite end adapted to prevent depression of said shutter trip member to make an exposure.

16. The invention as defined in claim 9 wherein a spring biased lever is reciprocally mounted on said shutter trip mechanism and has a hook at one end adapted to engage and stop said second spring, and a flange at the opposite end adapted to engage a stop to prevent depression of said shutter trip mechanism to make an exposure.

17. The invention as defined in claim 1 wherein said stub shaft is in axial alignment with said shutter shaft.

18. In a camera mechanism adapted to automatically actuate a shutter to make an exposure and advance the film an exposure frame, the combination of: first power means adapted to constantly urge said film in a direction advancing said film; first control means for releasing said first power means and arresting said first power means after said film has been advanced one exposure frame; second power means interconnecting said shutter and first power means for driving said shutter to make an exposure; second control means for releasing said second power means and arresting said second power means after one exposure has been completed; and actuating means actuable by said second power means for actuating said first control means substantially at the time that said second control means arrests said second power means whereby said first power means is released to advance said film one exposure frame and re-energize said second power means in preparation for the succeeding exposure.

19. The invention as defined in claim 18 wherein said first control means comprises a shaft, and said second power means comprises a shaft and a resilient means interconnecting said shafts.

20. The invention as defined in claim 18 wherein said first control means comprises a stub shaft having an ear; and further comprises a pivoted, spring biased dog member having one leg cooperating with said ear to arrest said stub shaft after it has completed one revolution; said second power means comprises a shutter shaft and a spring interconnecting said shafts; and said actuating means comprises a cam carried by said shutter shaft adapted to actuate another leg of said dog member substantially at the time that said second control means arrests said shutter shaft whereby said dog member is pivoted withdrawing said one leg from said ear to release said stub shaft and first power means.

21. In a camera mechanism having a shutter, the combination comprising film transport means, first biasing means for constantly biasing said film transport means in a direction to advance said film, detent means normally securing said film transport means against movement, shutter operating means, second biasing means for driving said shutter operating means to make an exposure, second detent means normally securing said shutter operating means against movement, means for operating said second detent means to release temporarily said shutter operating means to make a single exposure, means under the control of said shutter operating means to release said first detent means in timed relation with movement of said shutter operating means to permit advance of the film one exposure frame by said film transport means only after the shutter has substantially completed its movement for such exposure, and means interconnecting said first and second biasing means whereby said first biasing means re-energizes said second biasing means upon such film advancement by the film transport means.

References Cited in the file of this patent

UNITED STATES PATENTS 2,655,847    Harvey _____ Oct. 20, 1953

FOREIGN PATENTS 1,042,990    France _____ June 10, 1953